United States Patent [19]

Müller

[11] 4,156,456

[45] May 29, 1979

[54] APPARATUS FOR THE STORAGE AND FOR THE PREPARING OF FOODS, ESPECIALLY MEALS, TO BE SERVED

[75] Inventor: Paul Müller, Felsenau, Switzerland

[73] Assignee: Kreis AG, St. Gall, Switzerland

[21] Appl. No.: 808,405

[22] Filed: Jun. 20, 1977

[30] Foreign Application Priority Data

Jul. 9, 1976 [CH] Switzerland ............. 008820/76

[51] Int. Cl.² ............................................. F25B 29/00
[52] U.S. Cl. ................................. 165/48 R; 219/518
[58] Field of Search ............... 165/2, 48, 58, 61; 62/237; 126/21 A; 219/385, 386, 387, 400, 403, 433, 518, 521

[56] References Cited

U.S. PATENT DOCUMENTS

| | | | |
|---|---|---|---|
| 3,199,579 | 8/1965 | Foster et al. | 165/48 |
| 3,205,033 | 9/1965 | Stentz | 219/386 X |
| 3,908,749 | 9/1975 | Williams | 165/2 |
| 3,965,969 | 6/1976 | Williamson | 165/12 |
| 3,982,584 | 9/1976 | Spanoudis | 165/48 X |
| 4,005,745 | 2/1977 | Colato et al. | 165/2 |
| 4,019,022 | 4/1977 | Seider et al. | 165/48 X |

*Primary Examiner*—Samuel Scott
*Assistant Examiner*—Margaret A. Focarino
*Attorney, Agent, or Firm*—Werner W. Kleeman

[57] ABSTRACT

An apparatus for the storage and preparation of food, especially meals which are to be dispensed, comprising a closable cabinet, at least one tray or shelf which is insertable into such cabinet and removable therefrom, such tray being intended to receive dishes containing courses of a meal. Also, there is provided heating means which can be selectively turned-on and turned-off for heating the food which is to be heated-up. The tray is provided with means defining a region having a substantially horizontally accessible heating chamber intended for the reception of the food which is to be heated-up. The heating means associated with the tray and which can be turned-on upon insertion of the tray into the cabinet, extends substantially horizontally into the inner compartment of the cabinet, so that such heating means can be introduced into the heating chamber upon insertion of the tray into the cabinet.

16 Claims, 3 Drawing Figures

APPARATUS FOR THE STORAGE AND FOR THE PREPARING OF FOODS, ESPECIALLY MEALS, TO BE SERVED

BACKGROUND OF THE INVENTION

The present invention relates to a new and improved construction of apparatus for storing and preparing meals which are to be dispensed, which apparatus is of the type comprising a closable cabinet or cart equipped with at least one tray which can be inserted into and removed from such cabinet, this tray being intended to receive the food constituting the meal, as well as embodying at least one heating element or heating means, which can be turned-on and turned-off for heating the food.

Such type of equipment, usually constructed to be transportable, is especially employed in larger food-supply places or centers having a local centralized and/or timewise-concentrated preparation of the meals, to permit distribution of such meals to remote locations and/or at various staggered periods of time. This is the case typically, for instance, in hospitals, larger size canteens and in food-supply centers, where such establishments occupy a number of different stories, yet are serviced by a single kitchen. Also the use of such equipment is possible in conjunction with prepared or cooked meals in different entertainment or social establishments.

The greater the distance between the place of preparation and the place of distribution and/or the greater the time which elapses between preparation and distribution of the meals, the more important it becomes to maintain the hot food hot or to again reheat the same. However, as a general rule, a meal not only consists of hot food, for instance, soup, vegetables, meat dishes and so forth, but also of cold food, such as typically salad, desserts, beverages and the like. An apparatus of the previously mentioned type therefore should be universally adaptable to various meals composed of different courses and/or the external occurrences.

According to a state-to-the-art apparatus of the previously mentioned type the interior of the (travelling or mobile) cabinet is designed as a cold storage compartment i.e., a compartment for holding the food fresh, in the case of those food dishes which do not require any heating-up, whereas at an outer side of the cabinet there is provided a type of support framework for containers with the food dishes or courses of the meal which are to be heated-up. This outer side or end face of the cabinet can be coupled with a separate, likewise mobile unit which as a general rule is stationed at the distribution locality or station, and such unit, in turn, is equipped with heating elements dispositioned in such an arrangement that each heating element comes to lie beneath a number of the containers for the food to be heated-up and thus heats-up such food, when the unit is operatively connected or coupled with the cabinet.

This prior art equipment is associated with a number of different drawbacks. Firstly, the cabinet must be loaded with both cold food and food which is to be heated-up, so that putting together the complete meal first can be accomplished at the distribution station, that is to say, at the end of the transport path. Hence, valuable time is lost at the distribution station, since it would be more sensible and rational to put together the complete meal in the kitchen or in a neighboring food preparing room.

Secondly, the heretofore discussed prior art equipment can only be sensibly employed if there is present at the distribution station the unit equipped with the heating elements. If the distribution station is placed at a new location, then, it is not only necessary to bring the cabinet to a new place, but firstly this also must be done with the unit equipped with the heating elements.

Thirdly, with the state-of-the-art equipment mentioned above, all of the heating elements of the unit, when coupled with the cabinet, must be collectively turned-on. In other words: the unit is not capable of distinguishing whether the support framework is only partially loaded with containers or the like containing the food which is to be heated-up. Additionally, not only are the containers for the food which is to be heated-up heated, but also the support framework, so that after the heating-up time has expired hot containers must be removed from the hot support framework, something which at the very least is more bothersome than simply removing a cool, touchable tray or shelf from the cabinet.

SUMMARY OF THE INVENTION

Hence, with the foregoing in mind it is a primary object of the present invention to provide a new and improved construction of apparatus for the storage and preparation of food, especially meals, which are to be dispensed or served, in a manner not associated with the aforementioned drawbacks and limitations of the prior art.

Still a further significant object of the present invention aims at the provision of a new and improved construction of apparatus for the storage and preparation of food, in an extremely rational and simple manner, which apparatus is relatively simple in construction and design, extremely reliable in operation, easy to use, not readily subject to breakdown or malfunction, and economical to manufacture.

Still another significant object of the present invention aims at the provision of a food storage and preparation apparatus of the previously mentioned type wherein the trays can be stocked right from the beginning with a complete meal, in other words with both food to be heated-up and cold food and with the eating utensils, and at the distribution station the cabinet is not tied to the presence of a unit equipped with heating elements and compatable for use with such cabinet.

Now in order to implement these and still further objects of the invention, which will become more readily apparent as the description proceeds, the apparatus of the present development is manifested by the features that the tray or shelf possesses means defining a region having a substantially horizontally accessible heating chamber intended for the reception of the food which is to be heated-up. Further, the heating element associated with the tray and which can be turned-on upon insertion of the tray into the cabinet, extends substantially horizontally into the inner compartment or chamber of the cabinet, so that such heating element can be inserted or introduced into the heating chamber upon insertion of the tray into the cabinet.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
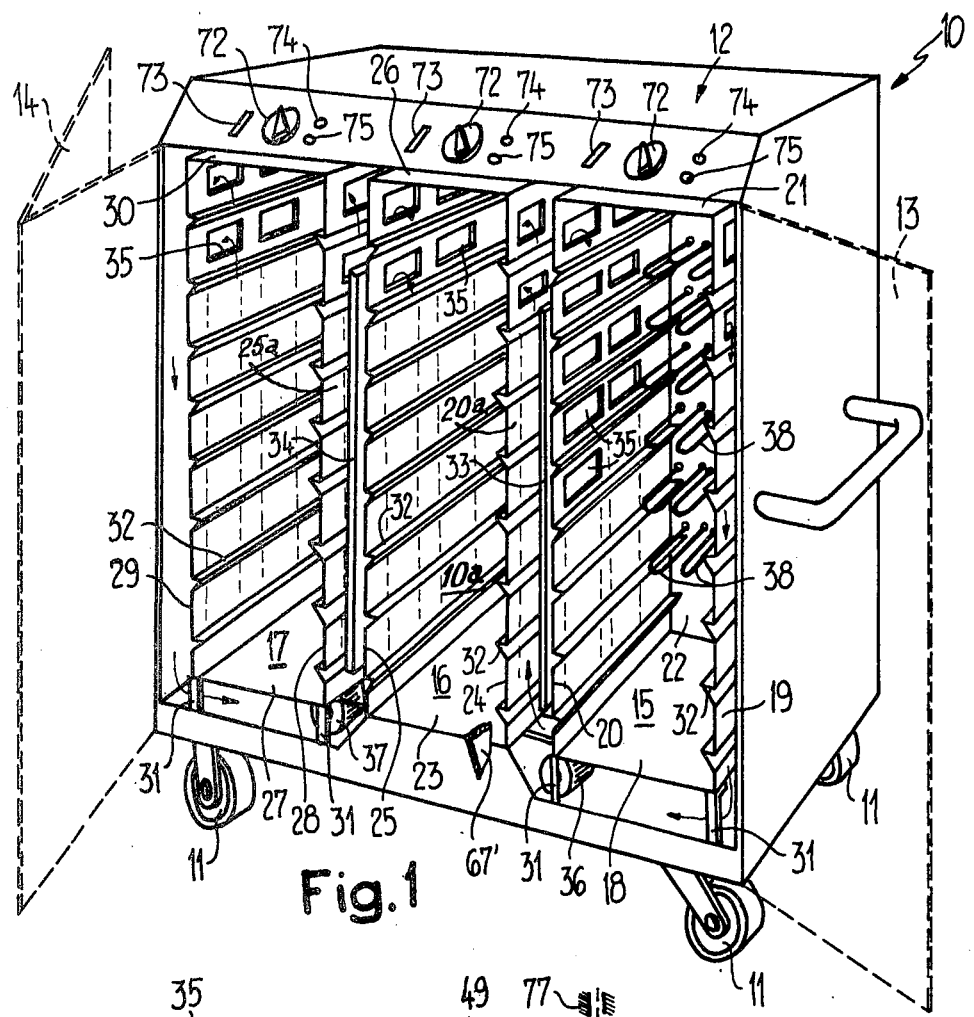
FIG. 1 is a perspective view of a travelling or mobile cabinet or cart for storing and preparing foods, constructed according to the teachings of the present invention, and shown equipped with closure doors or equivalent structure and with the trays or shelves removed for clarity in illustration.
Figure 2:
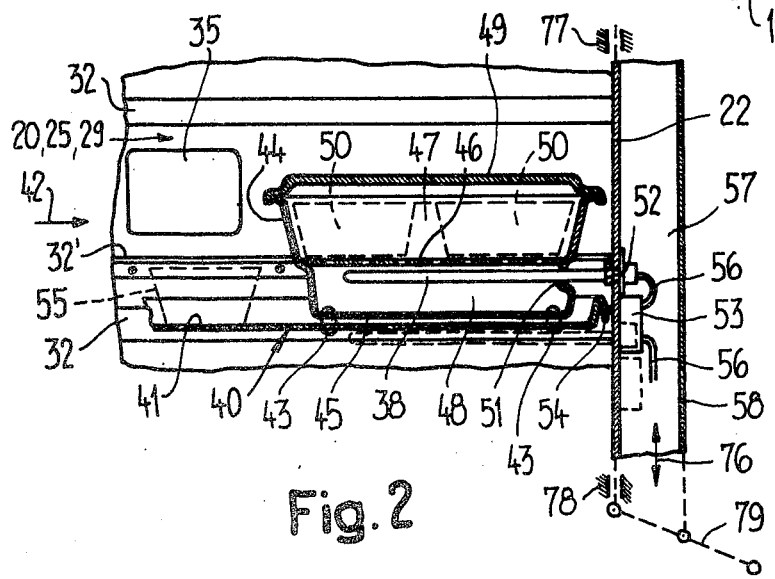
FIG. 2 is a fragmentary sectional view through a portion of a "level" or story of the cabinet shown in FIG. 1, portraying a tray which has been completely inserted.

Describing now the drawings, the exemplary embodiment of apparatus 10, shown in FIGS. 1 and 2, will be seen to comprise a mobile or travelling cabinet or cart 12 which is movable upon rollers or casters 11 or equivalent structure, and wherein the inner compartment 10a of the cabinet 12 is accessible from the longer side confronting the viewer of FIG. 1. This longer side can be closed by means of the schematically depicted doors or door wings 13 and 14, but it is to be understood that closing-off of the cabinet 12 can be accomplished by expedients other than door wings or the like, rather equally, for instance, by a horizontally or vertically guided shutter or other suitable structure. The inner compartment 10a of the cabinet 12, in the embodiment under consideration, is subdivided into three chambers or sections 15, 16 and 17. The individual compartment sections 15, 16 and 17 are each bounded by a wall arrangement, as will be more fully considered hereinafter. The wall arrangement for the chamber or section 15 will be seen to comprise a floor 18, two side walls 19 and 20 as well as a ceiling 21 and a rear wall 22. As far as the other chambers or compartment sections 16 and 17 are concerned, the corresponding elements, namely the floors have been designated by reference characters 23 and 27, respectively, the side walls by reference characters 24, 25 and 28, 29, respectively, and the ceilings by reference characters 26 and 30, respectively, with the rear walls of these compartment sections 16 and 17 not being visible in the showing of FIG. 1. These wall arrangements are dispositioned in spaced relationship from one another and at a spacing from the walls of the inner compartment 10a of the cabinet 12, so that a circulation space or chamber remains free about each compartment section or chamber. These wall arrangements are supported at the floor of the inner compartment 10a of the cabinet 12, for instance by means of the legs 31 or equivalent structure and are braced by not particularly illustrated struts or bars or the like, so that each of the compartment sections or chambers 15, 16 and 17 constitutes a "box" within the cabinet 12 and surrounded by a circulation space or chamber. In the circulation chamber or space 20a between the side walls 20 and 24 as well as in the circulation space or chamber 25a between the sidewalls 25 and 28 there is arranged a respective evaporator 33 and 34 which is part of an encapsulated cooling or refrigeration unit.

At the side walls 19, 20, 24, 25 and 28, 29 there are arranged in pairs confronting slide-in rails 32 which extend into the corresponding compartment section or chamber, and which, in the embodiment under discussion, are structured as corrugations in such side walls, but equally could be formed by substantially L-profile or structural members secured thereat. These slide-in rails divide each compartment into so-called levels or stories—there being shown by way of example eight such levels for each compartment—and serve, as will be explained more fully hereinafter, for supporting the trays which are to be pushed into the compartment sections or chamber in the manner in which baking trays are supported in a baking tube. Between the slide-in rails 32 there are provided in each side wall openings 35 which communicate with the circulation space surrounding the relevant compartment section, so that also even when each section is fully loaded by eight inserted trays each "level" thereof flow communicates with the circulation space or chamber around the compartment section. A respective blower impeller 36, 37 of a crosscurrent blower is located below the evaporators 33, 34, and these blower impellers circulate the air in the direction of the indicated arrows. Consequently, the air rises along the evaporators 33, 34, delivers heat thereto, i.e., is cooled, and then moves through one of the openings 35 into the compartment sections, flows therethrough in transverse direction and thus wipingly contacts each tray which has been inserted into the compartment section or chamber.

At the rear wall of each of the compartment sections 15, 16 and 17 there are attached heating elements 38, for instance three armoured heating rods or invisible infrared radiation devices, located at the height of each of the levels in the relevant compartment section. In FIG. 1 these heating elements 38 have only been shown for the compartment section or chamber 15 and of such there are only visible two such heating elements for each level or story. The heating elements 38 extend essentially horizontally over only a portion of the depth of the cabinet 12 into the compartment sections or chambers 15, 16 and 17.

Based upon the showing of FIG. 2 there will now be explained the apparent contradiction why heating elements are mounted in a cooled space, which with the inventive apparatus constitutes a sensible unit designed for the intended purposes. There will be recognized from the showing of FIG. 2 a part of one of the side walls 20, 25, 29 with two of the guide or slide-in rails 32 formed thereat and with one of the openings 35 located therebetween. There will be equally recognizable one of the heating elements 38 extending horizontally from the rear wall 22 into the related compartment section. At the lower slide-in rail 32 portrayed in FIG. 2 there is supported a tray designated in its entirety by reference character 40, however shown with a broken-away part. This tray 40 essentially consists of a rectangular support surface 41 which can be compared to a baking tray or tin, the size of which approximately corresponds to the cross-section of the chambers or compartment sections 15–17. At the front end of the support surface 41, viewed in the slide-in direction indicated by the arrow 42 there is mounted thereon, by means of push-button like attachment means 43, a fixture or mounting 44 having two floors 45 and 46, an intermediately disposed heating chamber 48 and a work space 47 which can be closed by a cover member 49, the fixture 44 preferably being secured to be detachable. This work space 47 of the fixture 44 serves for the reception of culinary utensils or dishes 50 in which there is prepared the hot food. The heating chamber 48 between the floors 45 and 46 is closed-off at all sides, with the exception of, for instance, a slot-shaped throughpassage opening 51 which is dimensioned and arranged such that the heating elements 38, upon insertion of the trays 40, can penetrate into the heating chamber 48 and thus are extensively separated from the remaining, cooled space of the compartment section. The height of the attachment location 52 of the heating elements 38 at the rear wall 22 and the height of the floor 46 over the slide-in rails 32 are advantageously accommodated to one another in such a manner that the heating elements 38 are dispositioned considerably closer to the floor 46 than the floor 45.

It is advantageous to construct the floor 46 of metal and, as shown in FIG. 2, to design the same as a grate which uniformly distributes the radiant energy transmitted by the heating elements 38 on to the floor surface of the culinary utensils or dishes 50. The grate- or grid shaped floor 46 can be removed out of the fixture or attachment 44. Such need not be formed of metal. With the exception of the grate 46 it can also be formed of cardboard or pulp sheet, preferably lined at the inside with metal, or of a plastic so that there is provided an additional thermal insulation of the heating chamber with respect to the remainder of the compartment section.

The heating elements 38 of each level in the compartment sections or chambers 15-17 are capable of being individually switched- or turned-on. For this purpose a limit switch 53 is connected in series with the heating elements 38 of each level, the switch 53 comprising, for instance, a microswitch which can be actuated by the forward, flexed edge 54 of the support surface 41 viewed in the slide- or push-in direction of the tray. Hence, it will be apparent that each heating element 38 is then only turned-on when a tray 40, at the corresponding level or story has been completely pushed-in. Furthermore, it will be apparent from what has been discussed above that with the heating elements 38 turned-on, in particular the grate or the floor 46 and thus the floor of the culinary utensils or dishes 50 present in the workspace 47 are heated whereas the floor 45, during the heating time under consideration, will be considerably less heated and the support surface 41 even less, since for the decisive heat transmission to the support surface 41 there are only present the push button-like attachment means 43 which furthermore can be formed of a plastic having a low thermal conductivity. The culinary utensils or dishes 55 containing the cold food are placed upon the part of the support surface 41 which is not occupied by the fixture 44 and are furthermore wipingly contacted by cooled circulating air, whereas the food in the culinary utensils 50 is heated-up, and specifically, essentially without forming any irksome crust, because heating is accomplished from the side of the floor.

At the side of the rear wall 22 which faces away from the corresponding compartment section, there is provided an intermediate space or region 57 essentially serving for the reception of the electrical connections or lines 56. The intermediate space 57 is closed off from the surroundings by the rear wall 58 of the cabinet 12. In order to carry out maintenance or servicing work this rear wall 58 can be likewise equipped with doors.

Figure 3:
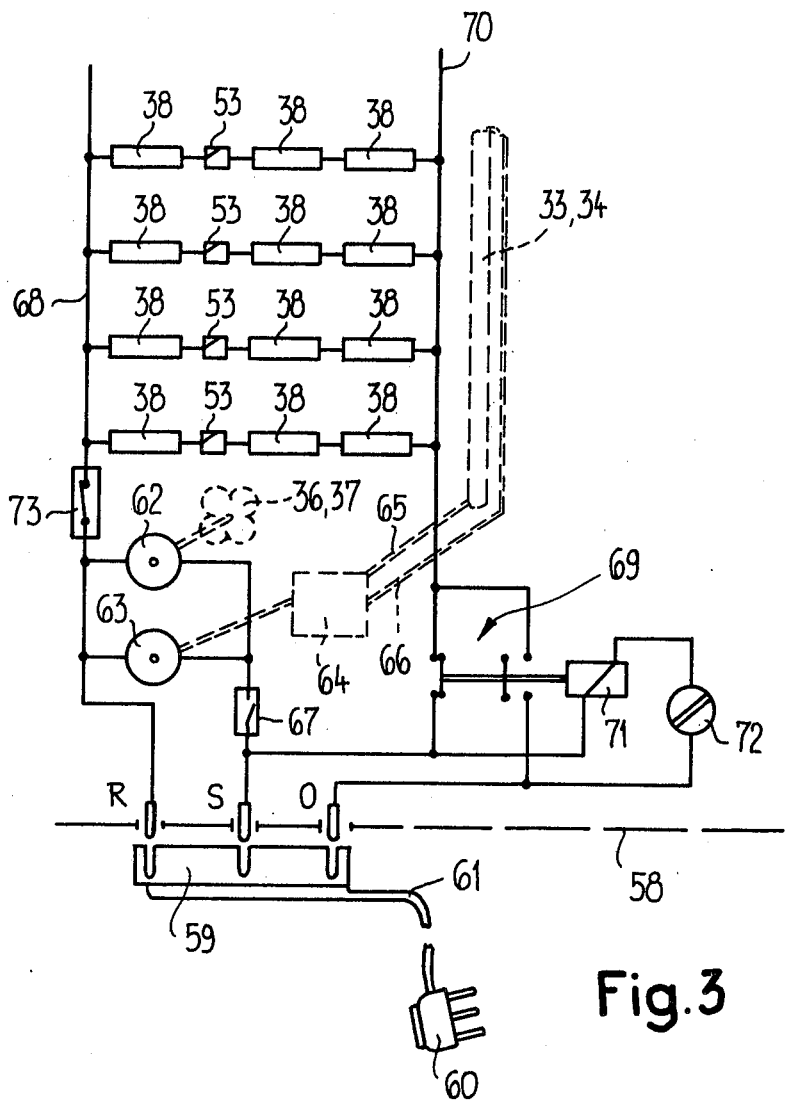
FIG. 3 is a simplified block circuit diagram of the electrical equipment of the cabinet of the arrangement of FIGS. 1 and 2.

In FIG. 3 there is illustrated a simplified block circuit diagram of the electrical equipment mounted in the cabinet 12. In this block circuit diagram the solid lines illustrate electrical conductors or lines, whereas the short broken lines represent mechanical or fluidic-connections. The long broken line represents the rear wall 58 of the cabinet. Through this rear wall 58 there extend three contact pins R, S, O, by means of which the cabinet 12 can be connected via a cable 61, carrying at one end a coupling element 59 and at the other end a plug 60, with for instance a conventional outlet socket (not shown) having two phase connections and a null line-connection.

By means of the contact pins R, S there is connected one or a respective motor 62 for the blower impellers 36, 37 as well as a motor 63 for the compressor 64 of the cooling or refrigeration unit, which compressor 64 is coupled by means of both cooling agent conduits or lines 65, 66 at the evaporators 33, 34. Both motors 62 can be switched-on by means of a switch 67 and are advantageously housed in a space 67' (FIG. 1) at the region of the floor of the cabinet 12.

The three heating elements 38 associated with each level or story and the associated limit switch 53 are connected in series and such series circuits are connected in parallel either individually for each of the compartment sections or chambers 15, 16 and 17 or for all compartment sections conjointly between a line 68 leading from the phase terminal or contact pin R and a line or conductor 70 leading to a reversing switch 69. The reversing switch 69 is actuated by a relay or solenoid 71 which, in turn, is connected by means of a timing clock or timer 72 (cf. also FIG. 1) with the phase terminal or contact pin S and the null line-terminal or contact pin O. By means of the reversing switch 69 the line 70 can be connected either with the phase terminal or contact pin S (as illustrated) or with the null line-terminal or contact pin O.

Hence, there can be applied to each of the series circuits of the heating elements 38 either the interlinked voltage or the phase voltage, for instance 380 volts or 220 volts respectively, so that the heating output can be switched for instance approximately in a ratio of 3:1 by throwing the reversing switch 69. By means of a cut-off switch 73 which is connected with the line or conductor 68 it is possible, when necessary, to turn-off all of the heating elements 38.

The circuitry of FIG. 3 is augmented by indicator lamps 74, 75 which have merely been shown in FIG. 1 and which indicate the switched position of the cut-off switch 73 and that of the reversing switch 69.

The field of application and the use of the illustrated apparatus are extremely simple. In the kitchen or in the preparing room the meals, depending upon the individual dishes in the culinary utensils 50 and 55 are prepared and—in contrast to the prior art equipment—placed ready for serving onto the appropriate region or zone of a tray. The thus-loaded trays 40 are then pushed into the compartment sections or chambers 15-17, and initially there is preferably only left turned-on the cooling unit.

If the cabinet 12 has been loaded with the desired number of meals or trays 40, respectively, then it can be moved to its destination, at that location reconnected to the power supply system, so that only the cooling unit or device remains switched-on. The carriage incorporating the cabinet 12 can be left in this condition over a longer period of time. Shortly prior to the time that the food should be served for eating, about 20 to 40 minutes beforehand, the cut-off switch 73 is closed and the timer clocks or timers 72 set. Now only the food which is to be heated is heated-up and as soon as the time which has been set at the timers has expired then the reversing switch 69 is switched, so that the heating elements then only provide approximately one-third of the starting heating power or output, i.e., a heating output which is sufficient for maintaining the heated-up food hot. By means of the cabinet 12 it is also possible to simultaneously distribute cold meals along with the heated-up food dishes. For this purpose it is adequate to ensure that the heating elements associated with the relevant level also are turned-off when the tray or shelf 40 has been inserted. This can be accomplished in a number of different ways. Thus, there can be arranged for instance above each of the slide-in rails 32 a further slide-in rail 32' (FIG. 2) at such an elevation that when a tray 40 is pushed into this further slide-in rail 32' the lower side of the support surface 41 is located just over the heating elements 38, so that there is suppressed the actuation of the limit switch 53. As schematically indicated in FIG. 2, a further possibility is to displaceably mount the rear wall 22 in the direction of the double-headed arrow 76 in the guides 77, 78 elevationally such that it can be shifted from one position where the heating elements 38 actually penetrate into the associated heating chamber 48 (illustrated in full lines in FIG. 2) into an inoperative position (shown in broken lines in FIG. 2), where the heating elements 38, which thus remained turned-off, do not penetrate into the heating chamber 48. To thus operate the displaceable rear wall 22 as explained above, a simple lever mechanism 79 can be operatively coupled with such rear wall 22.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An apparatus for the storage and for the preparation of food, especially meals which are to be served, comprising:
   means for defining a closable cabinet, said cabinet defining an internal compartment;
   means for dividing said internal compartment into sections;
   means defining a circulation space surrounding said internal compartment sections;
   a cooling unit arranged in said circulation space;
   at least one tray which can be inserted into and can be removed from any one of said internal compartment sections and which is intended to receive culinary utensils containing the courses of a meal;
   said tray being equipped with means for defining a horizontally accessible hollow space, said hollow space being bounded by an upper and a lower horizontal wall member, said upper wall member being adapted to receive thereon food which is to be heated;
   at least one heating element for heating-up the food which is to be served hot, said heating element extending approximately horizontally into said compartment section, so that, upon insertion of the tray, said heating element enters said hollow space of said tray; and
   means for automatically switching on said heating element upon insertion of the tray associated therein.

2. The apparatus as defined in claim 1, wherein: the shape of the tray approximately corresponds to the cross-section of one of the compartment sections.

3. The apparatus as defined in claim 1, wherein: said compartment dividing means includes side walls for said compartment sections;
   said side walls being equipped with through-passage opening means flow communicating with the circulation space; and
   circulation blower means cooperating with said evaporator.

4. The apparatus as defined in claim 1, wherein: said cabinet includes a rear wall of said inner compartment thereof; and
   said heating element extending from said rear wall into said internal compartment.

5. The apparatus as defined in claim 1, wherein: each heating element comprises an electrical invisible radiation-radiating means.

6. The apparatus as defined in claim 4, wherein: said heating element extends over a portion of the depth of the internal compartment of the cabinet.

7. An apparatus for the storage and for the preparation of food, especially meals which are to be served, comprising:
   means defining a closable cabinet;
   at least one tray which can be inserted into and removed from said cabinet and intended to receive culinary utensils containing the courses of a meal;
   at least one heating element which can be turned-on and turned-off for heating-up the food which is to be served hot;
   said tray being equipped with means defining a region having a substantially horizontally accessible heating chamber for receiving the food which is to be heated-up;
   said heating element being turned-on upon insertion of the therewith associated tray;
   said cabinet having an internal compartment;
   said heating element extending approximately horizontally into said internal compartment of the cabinet, so that upon insertion of the tray said heating element can be inserted into the heating chamber;
   said heating chamber is bounded by two floors defining an upper and lower floor; and
   the upper floor forming a workspace for the reception of the food to be heated.

8. The apparatus as defined in claim 7, wherein: the upper floor is structured as a metallic grate.

9. The apparatus as defined in claim 7, wherein: said floors and the workspace constitute components of a fixture;
   a substantially shelf-like support surface; and
   means for connecting said fixture to said support surface.

10. The apparatus as defined in claim 9, wherein: said connecting means releasably connects such fixture to said support surface.

11. The apparatus as defined in claim 9, wherein: said fixture, with the exception of said upper floor of the workspace, is essentially formed of a non-metallic material.

12. The apparatus as defined in claim 9, wherein: said connecting means for the connection of the fixture to the support surface comprises thermally insulating attachment elements.

13. The apparatus as defined in claim 11, wherein: said internal compartment of the cabinet is provided with a rear wall;
   said heating element extending from said rear wall into said internal compartment;
   said fixture being arranged at a front end region of the tray, viewed in the direction of insertion of the tray into the cabinet;

said fixture having a front end provided with throughpass opening means communicating with said heating chamber and serving for the insertion of the heating element.

14. An apparatus for the storage and for the preparation of food, especially meals which are to be served, comprising:

means defining a closable cabinet;

at least one tray which can be inserted into and removed from said cabinet and intended to receive culinary utensils containing the courses of a meal;

at least one heating element which can be turned-on and turned-off for heating-up the food which is to be served hot;

said tray being equipped with means defining a region having a substantially horizontally accessible heating chamber for receiving the food which is to be heated-up;

said heating element being turned-on upon insertion of the therewith associated tray;

said cabinet having an internal compartment;

said heating element extending approximately horizontally into said internal compartment of the cabinet, so that upon insertion of the tray said heating element can be inserted into the heating chamber;

a limit switch operatively associated with said heating element; and a tray having an edge for actuating said limit switch when said tray is inserted into the cabinet.

15. The apparatus as defined in claim 13, wherein:

said fixture is arranged at a front end of the tray, viewed in the direction of insertion of said tray into the inner compartment of said cabinet;

said fixture having a front end provided with throughpassage opening means communicating with the heating chamber and serving for the insertion of the heating element;

means defining a circulation space and equipped with openings communicating with the circulation space which are distributively arranged essentially over a predetermined portion of the depth of the inner compartment.

16. The apparatus as defined in claim 14, further including:

means for elevationally adjusting the rear wall from an operating position, where the heating element is insertable into the heating chamber and the limit switch is actuatable by the inserted tray, into an inoperative position where, with the tray inserted, the heating element is disposed externally of the heating chamber and the limit switch is turned-off.

* * * * *